United States Patent [19]

Erikson et al.

[11] Patent Number: 6,000,600

[45] Date of Patent: Dec. 14, 1999

[54] METHOD FOR WELDING WITH A VACUUM

[75] Inventors: Carl Edward Erikson, Schenectady; Angel Luis Ortiz, Jr., Ballston Spa, both of N.Y.

[73] Assignee: General Electric Company, Schenectady, N.Y.

[21] Appl. No.: 08/947,831

[22] Filed: Oct. 8, 1997

Related U.S. Application Data

[62] Division of application No. 08/572,337, Dec. 14, 1995, Pat. No. 5,713,506.

[51] Int. Cl.$^6$ .................................................. B23K 31/02
[52] U.S. Cl. ........................................ 228/212; 228/48
[58] Field of Search .................................. 228/212, 44.3, 228/48, 49.1, 60; 219/159, 121.13, 121.22, 121.63; 156/580, 285; 269/21

[56] References Cited

U.S. PATENT DOCUMENTS

| | | | |
|---|---|---|---|
| 2,679,713 | 6/1954 | Lytle | 269/21 |
| 2,968,715 | 1/1961 | Wyman et al. | 219/121.13 |
| 3,049,608 | 8/1962 | Greene | 219/121.13 |
| 5,499,755 | 3/1996 | Myers et al. | 228/48 |

FOREIGN PATENT DOCUMENTS

| 68628 | 5/1980 | Japan | 269/21 |
|---|---|---|---|

OTHER PUBLICATIONS

Metals Handbook Ninth Edition, vol. 6, pp. 626, 647, 1983.

*Primary Examiner*—Samuel M. Heinrich
*Attorney, Agent, or Firm*—Patrick K. Patnode; Marvin Snyder

[57] ABSTRACT

An exemplary method for welding a circular disk coaxially atop a tubular body comprises the steps of rotating the body and disk thereon, drawing a vacuum inside the body for vacuum holding the disk thereon, and welding the disk along a rim thereof to the body to sealingly join the disk thereto.

11 Claims, 2 Drawing Sheets

METHOD FOR WELDING WITH A VACUUM

This application is a division of application Ser. No. 08/572,337, filed Dec. 14, 1995, now U.S. Pat. No. 5,713,506.

BACKGROUND OF THE INVENTION

The present invention relates generally to welding, and, more specifically, to rim welding a thin disk to a tubular body.

A new pressure sensor is being developed which includes a tubular body having a central bore extending therethrough which includes internal threads. The body also includes a shallow counterbore defining a disk seat in which a very thin metal disk is disposed. It is required to weld the disk to the body around its circumference for providing a fixed and sealed joint therebetween. The disk is about 10 mils in thickness for example, and will support one or more strain gauges at the center of its outer surface for measuring strain therein due to pressure acting against the inner face of the disk. Pressure will deflect the disk and in turn create strain in the gauges which may be used for an indication of the pressure being measured.

In preliminary attempts to weld the disk using a conventional pulsed Nd:YAG laser, the disk warped at the beginning of the weld cycle displacing the disk from its machined fit in the disk seat. As the weld process continues, the disk either moves away from its seat or is welded in the wrong location, or burns completely away leaving a large void at the rim. Initially tack welding the disk at various circumferential locations, and then completing the weld leads to residual stress distortions in the disk which are unacceptable in creating an effective pressure sensor using strain gauges on the outer surface of the disk.

Accordingly, it is desired to provide a suitable fixture for supporting the sensor body and disk for allowing welding of the disk rim to the body in its proper position and without undesirable residual distortion and stress in the welded disk.

SUMMARY OF THE INVENTION

A welding fixture includes a stationary tubular outer manifold having an outer flow passage extending radially therethrough for drawing vacuum, and a tubular spindle extending coaxially therethrough. The spindle includes a mandrel at one end over which the bore of a tubular body is positioned. A sleeve at the opposite end of the spindle is used for rotating the spindle. An inner manifold adjoins the sleeve and is disposed inside the outer manifold, and has an inner flow passage extending radially therethrough and disposed in flow communication with the outer passage for drawing vacuum inside the spindle and in turn inside the body for retaining a disk thereon. An annular flange adjoins the mandrel and the inner manifold, and has a seat facing the mandrel for receiving the body at a complementary counterbore, and also includes a bearing land disposed in contact with the outer manifold for rotation thereon. The spindle is rotated for rotating the body and disk thereon for allowing welding of the disk to the body. Vacuum is drawn in the body through the spindle for vacuum holding the disk to the body during the welding process. An exemplary method for welding a circular disk coaxially atop a tubular body comprises the steps of rotating the body and disk thereon, drawing a vacuum inside the body for vacuum holding the disk thereon, and welding the disk along a rim thereof to the body to sealingly join the disk thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
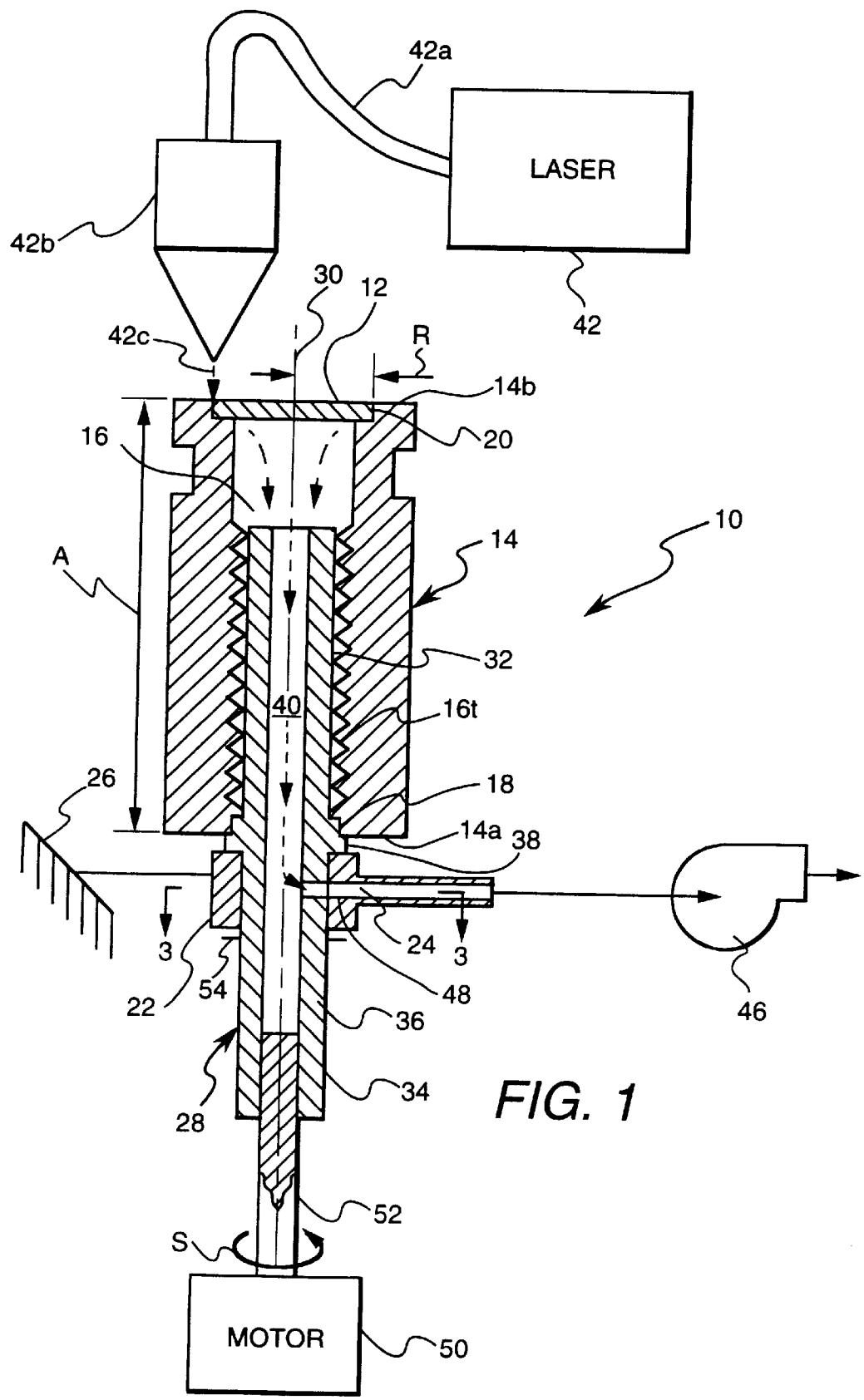
FIG. 1 is a schematic, elevational, partly sectional view of an exemplary welding fixture for supporting and rotating a tubular body for vacuum holding a disk atop the body for welding thereof in accordance with one embodiment of the present invention.

Illustrated schematically in FIG. 1 is a welding apparatus or fixture 10 in accordance with an exemplary embodiment of the present invention for holding a circular disk 12 for being welded coaxially atop a tubular sensor or transducer body 14. The body 14 includes a central bore 16 extending completely therethrough from a lower counterbore 18 at a first or lower end 14a of the body upwardly to a coaxial disk seat 20 which is defined by a shallow upper counterbore at a second or top end 14b of the body which receives therein the disk 12. In this exemplary embodiment, the disk 12 is relatively thin, about 0.25 mm for example, and has a relatively small outer diameter of about 10 mm for example. The disk seat 20 is complementary in configuration with the disk 12 for coaxially receiving the disk 12 with a flush common surface with the body top end 14b. The body bore 16 includes internal threads 16t which are used for mounting the body 14 to a suitable threaded fastener (not shown).

It is desirable to provide a flush weld around the rim or circumference of the disk 12 to fixedly and sealingly join the disk 12 to the sensor body 14 accurately and without undesirable distortion and residual stress therein due to the welding process. The body 14 forms a portion of a pressure sensor in which conventional strain gauges will be suitably attached to the outer surface of the disk 12 so that deflections thereof caused by pressure acting on the inner surface will create strain in the disk 12 which is measured by the gauges for providing an indication of the magnitude of the pressure. The disk 12 should therefore be seal-welded to the body 14 uniformly around its rim for providing an effective pressure sensor when completed.

The welding fixture 10 includes a stationary tubular outer manifold 22 having a radially outer flow passage 24 extending radially therethrough for drawing vacuum. The outer manifold 22 is suitably fixedly attached to a stationary frame 26.

The fixture 10 also includes a tubular spindle 28 having a longitudinal or axial centerline axis 30 which is removably mounted in the outer manifold 22 for supporting the sensor body 14. The sensor body 14 and disk 12 are stainless steel for example, with the outer manifold 22 being brass and the spindle 28 being aluminum for example.

The spindle 28 has integral components in coaxial alignment including a mandrel 32, a sleeve 34, an inner manifold 36, and an annular flange 38 which are all tubular and define a central spindle bore 40 therethrough.

The mandrel 32 is cylindrical and is disposed at the top end of the spindle 28 and has a suitable length and outer diameter for receiving the body bore 16 therearound. The sleeve 34 is disposed at an opposite or lower end of the spindle 28 and is used for rotating the spindle 28. The inner manifold 36 adjoins the sleeve 34 at a lower intermediate portion of the spindle 28 and is disposed coaxially inside the outer manifold 22 in a suitable close fit therewith. The flange 38 adjoins the mandrel 32 at the upper intermediate portion of the spindle 28 adjacent the inner manifold 36 for receiving the body 14 at the counterbore 18.

Figure 2:
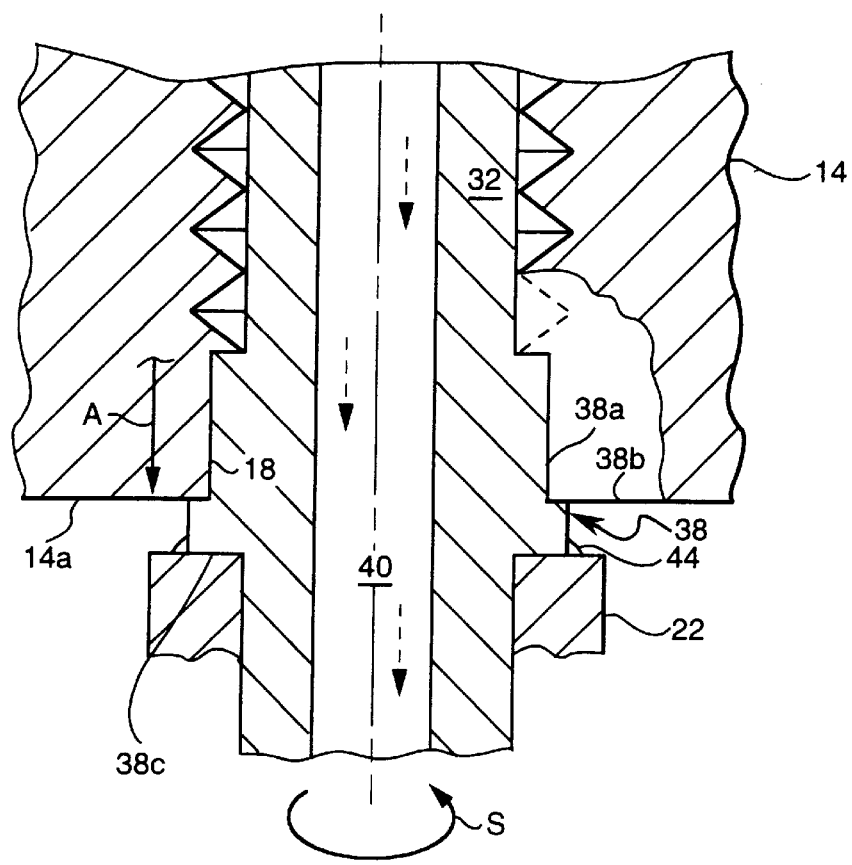
FIG. 2 is an enlarged, elevational sectional view through a portion of the spindle and vacuum manifold supporting the body illustrated in FIG. 1.

More specifically, the flange 38 is illustrated in more particularity in FIG. 2 and defines a body seat facing upwardly toward the mandrel 32 for receiving the body 14 at the counter bore 18. In the exemplary embodiment illustrated in FIG. 2, the flange 38 includes two steps for defining a cylindrical radial seat 38a being complementary in diameter with the body counterbore 18 for seating the counterbore 18 to limit radial runout of the body 14 at the disk seat 20, as shown in FIG. 1, as the spindle 28 rotates the body 14 and the disk 12 thereon at a suitable rotary speed S, such as 5 rpm for example. As shown in FIG. 1, radial runout is the change in radial position R of the disk rim relative to the rotational centerline axis 30 as the spindle 28 is rotated. The difference in diameter between the radial seat 38 and counterbore 18 illustrated in FIG. 2 should be suitably small for limiting radial runout, and may be about 0.05 mm for example. Since the spindle 28 rotates within the outer manifold 22, the difference in diameter between the rotating fit of the outer and inner manifolds 22, 36 should also be relatively small, and also about 0.05 mm for example. In this way, rotation of the spindle 28 correspondingly rotates the body 14 to limit radial runout of the disk 12.

In the exemplary embodiment illustrated in FIG. 1, a conventional pulsed Nd:YAG laser 42 includes a suitable fiber optic 42a which operatively joins the laser 42 to a conventional torch 42b for directing a laser beam 42c at the joint between the rim of the disk 12 and the disk seat 20 for welding together these components, preferably without a filler material for obtaining a substantially flush weld. Since the laser torch 42b is preferably fixedly mounted in space, it is desirable to limit radial runout around the disk rim for ensuring effecting welding therearound. Other types of welders, such as TIG welders, may also be used.

Since the laser torch 42b is preferably fixedly mounted in space, it is also desirable to position the disk seat 20, and therefore the disk 12 disposed flush with the body top end 14b, at a redetermined axial position A during welding of the disk 12 to the body 14. This is accomplished by providing an axial seat 38b, as illustrated in FIG. 2, adjoining the radial seat 38a for seating the body lower end 14a thereon. The axial seat 38b is a flat annulus which faces upwardly toward the mandrel 32 so that both the radial and axial seats 38a, b correspondingly support the counterbore 18 at the corner defined with the body lower end 14a.

The bottom surface of the flange 38 defines a bearing land 38c which is disposed in contact with the upper surface of the outer manifold 22 for rotation thereon. The bearing land 38c is a flat annulus, and preferably a suitable lubricant 44 is disposed between the spindle 28 and the outer manifold 22 over the bearing land 38c for lubricating as well as vacuum sealing the rotating joint therebetween. A suitable vacuum pump grease may be used for the lubricant 44 which allows free rotation while providing an effective vacuum seal between the bearing land 38c and the outer manifold 22.

Figure 3:
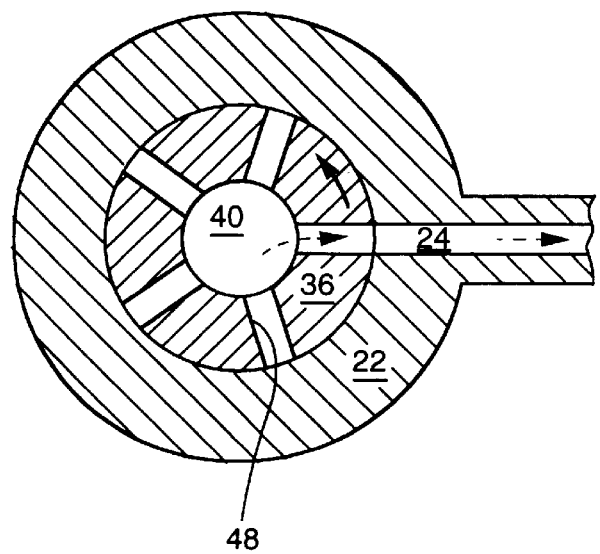
FIG. 3 is a radial sectional view through the manifold and spindle illustrated in FIG. 1 and taken along line 3—3.

As shown in FIG. 1, a suitable vacuum pump 46 is disposed in flow communication with the outer manifold 22 for drawing a vacuum through the outer flow passage 24. As shown in more detail in FIG. 3, the inner manifold 36 includes at least one and preferably a plurality of circumferentially spaced apart inner flow passages 48 extending radially therethrough for being disposed in flow communication with the outer passage 24 for drawing the vacuum inside the spindle 28 through the spindle bore 40, and in turn inside the body 14 below the disk 12 for retaining the disk 12 against the disk seat 20. As shown in FIG. 3, the inner passages 48 may be equidistantly spaced apart from each other for being sequentially radially aligned with the outer passage 24 for drawing and maintaining vacuum inside the spindle bore 40. In an alternate embodiment, the inner circumference of the outer manifold 22 may include an annular groove disposed in flow communication with the outer passage 24 for providing continuous flow communication with one or more inner flow passage 48.

As shown in FIG. 1, a conventional drive motor 50 includes a rotatable drive shaft 52 having a distal end fixedly and sealingly joined to the spindle sleeve 34 for rotating the spindle 28. The drive shaft 52 may simply engage the inner surface of the sleeve 34 in a friction fit for both rotating the spindle 28 when required and for maintaining vacuum in the spindle bore 40.

In order to limit radial runout of the disk 12 during the welding process, the spindle bore 40 is preferably machined therein completely therethrough along a common centerline axis 30. The outer surface of the inner manifold 36 is mounted for rotation within the inner surface of the outer manifold 22 with a suitably close fit for limiting radial runout of the disk 12. And, the lower counterbore 18 of the body 14 is accurately machined coaxially therewith and coaxially with the disk seat 20 for additionally limiting radial runout of the disk rim by providing a suitably close fit between the counterbore 18 and the radial seat 38a. In this way, rotation of the drive shaft 52 in turn rotates the spindle 28 and the sensor body 14 thereon for accurately rotating the disk rim with minimal radial runout for effecting a uniform weld around the disk rim.

The fixture 10 includes two basic and simple components, i.e. the spindle 28 mounted in the outer manifold 22, which can be suitably maintained together by a conventional retainer ring 54 shown in FIG. 1 suitably below the outer manifold 22. A corresponding groove in the sleeve 34 receives the ring 54 and prevents separation from the outer manifold 22.

In the preferred embodiment illustrated in FIG. 1, the spindle 28 is disposed vertically so that the body 14 rests by gravity atop the spindle 28 at the flange 38, with the spindle 28 and body 14 also resting by gravity atop the stationary outer manifold 22. The body 14 therefore simply engages the radial and axial seats 38a, b in gravity abutment, with the mandrel 32 ensuring vertical alignment of the body 14 atop the flange 38. Vacuum in the spindle 28 provides additional retention force for the body 14.

In operation, the body 14 is rotated by the spindle 28 driven by the motor 50, with the vacuum pump 46 drawing a vacuum through the spindle 28 and inside the body 14 below the disk 12 for vacuum holding the disk 12 in its seat 20. A suitable amount of vacuum below the disk 12 is effective for temporarily sealing the disk 12 in the seat 20 and holding the disk 12 therein as the welding process continues around the rim of the disk 12. The vacuum against the inner surface of the disk 12 is effective for restraining thermal distortion of the disk 12 during the welding process and maintaining the rim of the disk 12 in contact with the seat 20 until the complete 360° weld is finished. The resulting, welded disk 12 has a continuous rim weld without undesirable residual stresses in the disk 12 itself so that the strain gauges may be attached to the inner surface of the disk 12 for forming an effective pressure sensor.

The welding process is substantially improved by the simple arrangement of mounting the body 14 atop the mandrel 32 of the spindle 28, with the radial and axial seats 38a, b engaging the lower counterbore 18, and then simply rotating the spindle 28 at the sleeve 34 to in turn rotate the body 14 as the laser beam 42c welds the disk rim in the disk seat 20. The outer and inner manifolds 22, 36 allow the spindle 28 to rotate freely about its centerline axis with a suitable sealed joint therebetween for maintaining an acceptable vacuum below the disk 12.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method for laser welding a circular disk coaxially atop a tubular body comprising:

rotating said body, and disk thereon;

drawing a vacuum inside said body for vacuum holding said disk thereon; and laser welding said disk along a rim thereof to said body to sealingly join said disk thereto.

2. A method according to claim 1 wherein said body has a counterbore at a lower end, and a disk seat at an opposite top end receiving said disk, and further comprising:

mounting said body atop a spindle having a seat disposed in said counterbore;

rotating said spindle to rotate said body; and drawing said vacuum in said body through said spindle.

3. The method of claim 1, wherein the step of rotating the body comprises:

mounting the body on a spindle; and rotating the spindle.

4. The method of claim 3, further comprising the step of providing a radial seat in the spindle which is complementary in diameter with a counterbore in the body to limit a radial movement of the body.

5. The method of claim 3, further comprising the step of providing an axial seat in the spindle which is complementary with a lower end of the body to limit an axial movement of the body.

6. The method of claim 3, further comprising the step of rotating the spindle within a stationary outer manifold.

7. The method of claim 6, further comprising the step of providing a lubricant between the spindle and the outer manifold which seals the spindle and the outer manifold.

8. The method of claim 6, further comprising the step of drawing the vacuum through an outer passage in the outer manifold which is in fluid communication with an inner passage in the spindle.

9. The method of claim 8, further comprising the step of drawing the vacuum through a plurality of inner passages in the spindle, which inner passages are radially aligned.

10. The method of claim 1, further comprising the steps of:

vertically aligning the body; and resting the disk in a disk seat in a top end of the body.

11. The method of claim 1, wherein the step of laser welding the disk comprises directing a laser beam to the disk.

* * * * *